United States Patent
Keller et al.

(10) Patent No.: US 8,823,390 B2
(45) Date of Patent: Sep. 2, 2014

(54) SOLENOID-OPERATED VALVE AND METHOD OF MONITORING SAME

(75) Inventors: Robert Dean Keller, Davisburg, MI (US); Steven Lee Ambrose, Farmington Hills, MI (US); Eric Otis Barrows, Richmond, MI (US)

(73) Assignee: Eaton Corporation, Cleveland, OH (US)

( * ) Notice: Subject to any disclaimer, the term of this patent is extended or adjusted under 35 U.S.C. 154(b) by 259 days.

(21) Appl. No.: 13/160,583

(22) Filed: Jun. 15, 2011

(65) Prior Publication Data

US 2012/0319700 A1 Dec. 20, 2012

(51) Int. Cl.
*G01R 27/28* (2006.01)
*F16K 31/06* (2006.01)
*F16K 37/00* (2006.01)

(52) U.S. Cl.
CPC ......... *F16K 37/0075* (2013.01); *F16K 31/0644* (2013.01); *F16K 31/0675* (2013.01)
USPC ......... 324/617; 324/677; 324/711; 324/76.22

(58) Field of Classification Search
USPC .............. 324/600, 617–622, 677, 711, 76.11, 324/76.22, 423, 532, 535
See application file for complete search history.

(56) References Cited

U.S. PATENT DOCUMENTS

| 5,492,009 A | 2/1996 | Kempf |
| 6,326,898 B1 | 12/2001 | O'Leyar et al. |
| 2006/0285265 A1 | 12/2006 | Ganev et al. |
| 2009/0107682 A1 | 4/2009 | Davis |
| 2010/0327199 A1* | 12/2010 | Linortner ................. 251/129.15 |

FOREIGN PATENT DOCUMENTS

| DE | 3807278 A1 | 9/1989 |
| DE | 4013393 A1 | 10/1991 |
| GB | 1354378 A | 6/1974 |
| WO | 2008089783 A1 | 7/2008 |
| WO | 2009106080 A1 | 9/2009 |

OTHER PUBLICATIONS

European Patent Office; International Search Report and Written Opinion issued in counterpart International Application PCT/IB2012/001142. Date of Mailing Jul. 11, 2012.

* cited by examiner

*Primary Examiner* — Melissa Koval
*Assistant Examiner* — Trung Nguyen
(74) *Attorney, Agent, or Firm* — Dykema Gossett PLLC

(57) ABSTRACT

A method for monitoring operation of a solenoid valve having an armature and a poppet coupled to the armature includes the steps of energizing a coil in the valve to generate a current signature reflecting current vs. time, detecting a first inflection point in the current signature, wherein the first inflection point occurs when the armature starts to move from one of the open and closed positions toward the other of the open and closed positions, and detecting a second inflection point in the current signature. The second inflection point occurs when the armature moves completely to the other of the open and closed positions. In one embodiment, the first inflection point indicates when the valve begins to open, making it possible to accurately determine the elapsed opening time of the valve.

20 Claims, 2 Drawing Sheets

SOLENOID-OPERATED VALVE AND METHOD OF MONITORING SAME

TECHNICAL FIELD

The present invention relates to a method for monitoring the operation of a solenoid-actuated valve and a valve structure having operating characteristics that makes it easier to monitor in the inventive manner.

BACKGROUND OF THE INVENTION

Solenoid-actuated valves are used in many applications, including but not limited to fuel vapor control. It may be desirable to monitor the movement of an armature as it moves between the closed and open positions when the solenoid coil is energized by an actuating voltage across the coil. Typically, the armature begins to move after the current in the coil builds up to a sufficient level. The armature then moves until it reaches an end point where it comes to a full stop in an open position.

To monitor the motion of the solenoid, there are circuits that detect when the valve is either open or closed by detecting discontinuities in the current signature of the coil current. More particularly, the current signature has a significant discontinuity (e.g., a sharp dip in the current level) when the armature reaches a fully open position and a similar discontinuity when the armature reaches a fully closed position. Currently known monitoring methods compare the actual current signature and a predetermined current signature between time values corresponding to the end points, or hard stops, in the armature travel path.

Although existing methods can determine whether a valve is functioning properly by measuring the current and the elapsed time between the hard stops, there is currently no way to detect when the valve begins to open (i.e., "cracks" open) because there may a delay between the time the coil is energized and the time the armature begins to open the valve due to, for example, the time required to build sufficient current to move the armature and/or to take up any lash in the armature. In other words, existing methods only detect the hard stops in the armature movement, not any subtle movements of the armature between the two hard stops. As a result, there is no way to accurately determine the time period during which the armature is actually moving, making it difficult to pinpoint how long the valve is actually open during a given energization cycle.

There is a desire for a method that can accurately detect when the valve cracks open as well as when the valve is fully open to provide additional information that may be used to, for example, improve operation in a fuel vapor control system or enhance the diagnostic capabilities of the system in which the valve operates.

SUMMARY OF THE INVENTION

An embodiment of the invention is directed to a method for monitoring operation of a solenoid valve having an armature and a poppet coupled to the armature and disposed on a valve seat, wherein the armature is movable between an open position and a closed position. The method includes the steps of energizing a coil in the valve to generate a current signature reflecting current vs. time, detecting a first inflection point in the current signature, wherein the first inflection point occurs when the armature starts to move from one of the open and closed positions toward the other of the open and closed positions, and detecting a second inflection point in the current signature, wherein the second inflection point occurs when the armature moves completely to the other of the open and closed positions.

An embodiment of the invention is also directed to a solenoid valve comprising a coil, an armature that moves between a closed position when the coil is de-energized and an open position when the coil is energized, a poppet coupled to the armature such that a space is disposed between the poppet and the armature, and a valve seat. The valve has a current signature when the coil is energized, and the space between the armature and the poppet causes the current signature to have a first inflection point when the armature starts to move toward the open position and the poppet starts to lift off of the valve seat.

DETAILED DESCRIPTION OF THE EMBODIMENTS

Figure 1:
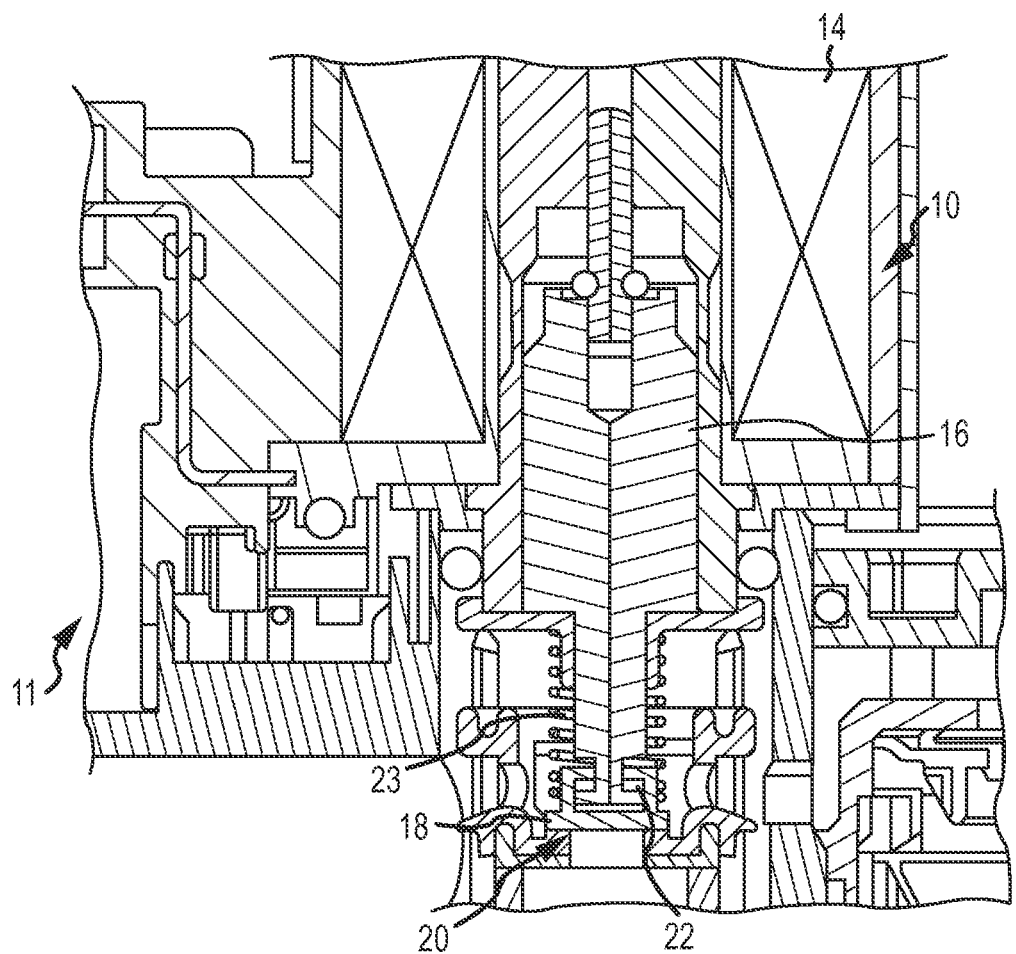
FIG. 1 is a cross-sectional diagram of a valve according to one embodiment of the invention.
Figure 2:
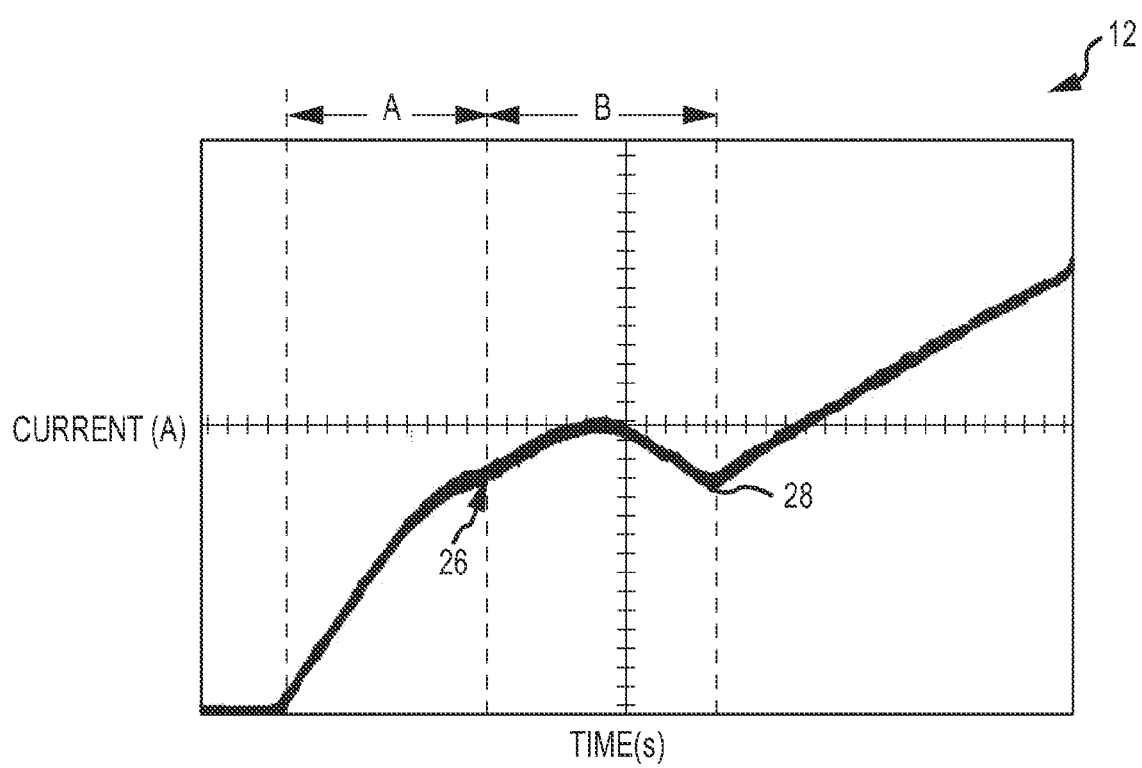
FIG. 2 is a current signature of a valve to illustrate a method according to one embodiment of the invention.

FIG. 1 is a representative diagram of a portion of a solenoid valve 10 disposed in a fuel vapor control valve 11, and FIG. 2 illustrates an example of a solenoid inductive current signature 12 (current vs. time) of the valve 10 during operation. The valve 10 in FIG. 1 is shown in a de-energized position. The valve 10 may include a solenoid coil 14 and an armature 16. The armature 16 is movable between a closed position (as shown in FIG. 1) and an open position. In one embodiment, a sliding poppet 18 may be disposed at an end of the armature 16 and engaged with a valve seat 20 when the armature 16 is in the closed position. A space 22 between the armature 16 and the poppet 18 may create a small amount of play, or "lash," between the armature 16 and the poppet 18. A preloaded spring 23 may be disposed against the poppet 18 to bias the poppet 18 against the valve seat 20 so that the valve 10 may remain closed even under pressurized conditions.

The embodiment shown in FIG. 1 is a normally-closed valve 10 where the armature 16 is in the closed position and the poppet 18 is engaged with the valve seat 20 when the coil 14 is de-energized. However, those of ordinary skill in the art will understand that other valve structure may be used without departing from the scope of the invention.

When a voltage is applied across the coil 14, the coil 14 energizes and the current through the coil 14 increases as shown in portion A of FIG. 2. During this time, current builds in the coil 14 until the current level is high enough to generate sufficient magnetic force to move the armature 16. The armature 16 moves toward the open position and closes the space 22 between the armature 16 and the poppet 18 until it contacts a top portion of the poppet 18. At this point, the armature 16 and the poppet 18 are tightly coupled together.

As current continues to flow through the coil 14, the armature 16 continues to move toward the open position, tightly coupling the armature 16 to the poppet 18. Continued upward motion of the armature 16 lifts the poppet 18 away from the valve seat 20. At this point, the valve 10 "cracks" open (i.e., just begins to open). The current signature reflects this change in the valve state via a first inflection point 26. The first inflection point 26 occurs when the slope of the current signature 12 decreases. The first inflection point 26 may be subtle, as shown in FIG. 2, but in higher-pressure applications, the first inflection point 26 may be more pronounced and may even be significant enough so that the magnitude of applied vapor pressure can be detected.

Note that this first inflection point 26 is a result of the loose coupling between the armature 16 and the poppet 18. More particularly, the loose coupling allows detection of the valve 10 initially opening because the current signature changes as the armature 16 shifts from moving independently to moving together with the poppet 18. In typical solenoid valves, the armature and poppet are tightly coupled via staking or press-fitting or even formed as a one-piece construction, causing the armature and poppet to move together essentially in unison. By loosely coupling the armature 16 and poppet 18, the inventive structure generates a current signature that makes it easier to detect when the valve 10 cracks open. The loose coupling also provides additional degrees of freedom in the sealing action of the poppet 18, making it more forgiving to tolerance stack-up in the valve 10.

As the armature 16 continues to move toward the open position, the current continues to rise and the current signature reflects a valve rise-time opening response, as shown in portion B of FIG. 2. The signature 12 in portion B reflects the profile of the inductive current through the solenoid coil 14 of the valve 10 between the time it begins to open and the time it is fully open. Depending on the specific operating characteristics of the valve 10, the slope of the current signature 12 may increase in portion B. When the armature 16 reaches its final stop after a full stroke and the valve 10 is fully open, the current signature 12 reflects a second inflection point 28

Since portion B is bound by the first and second inflection points, 26, 28, which respectively reflect the time the valve 10 begins to open and the time the valve 10 is fully open, portion B accurately reflects the travel time of the armature 16 during a single stroke from the closed position to the open position (i.e., an elapsed opening time). Unlike the prior art, the invention ensures that there is no uncertainty regarding when the valve 10 is open.

The elapsed opening time provides valuable information that can be used in various applications. For example, in a fuel emissions system, the elapsed opening time may be used to calculate an amount of fuel vapor pulse-mass released by the valve 10 under a particular pressure condition or, when viewed in conjunction with a dynamic pressure drop across the valve. The elapsed opening time may also be used in any application requiring metering (e.g., fuel injection) or be compared with an expected opening time to diagnose proper valve operation.

Although the above examples focus on a normally-closed valve, the inventive concepts may be applied to other types of valves as well without departing from the scope of the invention as long as the current signature generates a first inflection point when the armature begins to change positions and a second inflection point when the armature reaches a hard stop at its new position. An elapsed operating time between the two inflection points provides valuable information on when the armature is actually moving during a given operational cycle.

While the best modes for carrying out the invention have been described in detail, those familiar with the art to which this invention relates will recognize various alternative designs and embodiments for practicing the invention within the scope of the appended claims.

What is claimed is:

1. A method for monitoring operation of a solenoid valve having an armature and a poppet coupled to the armature and disposed on a valve seat, wherein the armature is movable between an open position and a closed position, comprising:

energizing a coil in the valve to generate sufficient magnetic force to move the armature and to generate a current signature reflecting current vs. time;

detecting a first inflection point in the current signature, wherein the first inflection point occurs when the armature starts to move from one of the open and closed positions toward the other of the open and closed positions, and wherein the first inflection point corresponds to a decrease in a slope of the current signature; and detecting a second inflection point in the current signature, wherein the second inflection point occurs when the armature moves completely to the other of the open and closed positions;

wherein the first inflection point and the second inflection point respectively reflect a time the valve begins to open and a time the valve is fully open, and wherein a time between the first inflection point and the second inflection point reflects a travel time of the armature during a single stroke from the closed position to the open position.

2. The method of claim 1, wherein the second inflection point corresponds to a hard stop of the armature.

3. The method of claim 1, wherein the valve is a normally closed valve.

4. The method of claim 3, wherein there is a space between the armature and the poppet, wherein the poppet is disposed on a valve seat, and wherein the first inflection point occurs when the armature couples with the poppet and starts to lift the poppet from the valve seat as the armature starts to move toward the open position.

5. The method of claim 4, further comprising calculating a time difference between the first and second inflection points to obtain an elapsed opening time.

6. The method of claim 1, further comprising calculating a time difference between the first and second inflection points to obtain an elapsed operating time.

7. The method of claim 6, including comparing the calculated elapsed opening time to an expected opening time.

8. The method of claim 1, wherein at least one of the armature and the poppet is configured to move relative to the other of the armature and the poppet.

9. The method of claim 1, including moving the armature relative to the poppet.

10. The method of claim 1, including calculating an amount of fuel-vapor pulse-mass released by the solenoid valve.

11. A solenoid valve, comprising:
a coil;
an armature that moves between a closed position when the coil is de-energized and an open position when the coil is energized;
a poppet coupled to the armature, wherein a space is disposed between the poppet and the armature; and
a valve seat,
wherein the valve has a current signature when the coil is energized, and wherein the space between the armature and the poppet causes the current signature to have a first inflection point when the armature starts to move toward the open position and the poppet starts to lift off of the valve seat;
wherein the current signature includes a second inflection point corresponding to the valve being completely open, and wherein a time between the first inflection point and the second inflection point corresponds to a travel time of the armature during a single stroke from the closed position to the open position.

12. The solenoid valve of claim 11, wherein the second inflection point corresponds to when the armature reaches a hard stop at the open position.

13. The solenoid valve of claim 11, further comprising a spring that biases the poppet against the valve seat.

14. The solenoid valve of claim 11, wherein at least one of the armature and the poppet is configured to move relative to the other of the armature and the poppet.

15. A solenoid valve, comprising:
- a coil;
- a poppet;
- an armature coupled to the poppet and movable relative to the poppet, the armature having an open position and a closed position; and
- a current signature including a first inflection point and a second inflection point, the first inflection point corresponding to an initial movement of the poppet away from one of the open and closed positions, and the second inflection point corresponding to the poppet reaching the other of the open and closed positions;
- wherein a time between the first inflection point and the second inflection point corresponds to a travel time of the poppet during a single stroke between the open position and the closed position.

16. The solenoid valve of claim 15, wherein the armature is coupled to move relative to the poppet in a first range of positions of the armature and the armature is coupled to move with the poppet in a second range of positions of the armature.

17. The solenoid valve of claim 16, wherein the first inflection point corresponds to when the armature moves from the first range to the second range.

18. The solenoid valve of claim 17, wherein the second inflection point corresponds to when the solenoid valve is fully open with the armature and the poppet at an end of the second range.

19. The solenoid valve of claim 18, wherein an amount of time between the first inflection point and the second inflection point corresponds to an elapsed opening time.

20. The solenoid valve of claim 15, wherein the solenoid valve is normally open.

* * * * *